(12) United States Patent
Mathison (10) Patent No.: US 11,339,926 B2
(45) Date of Patent: May 24, 2022

(54) METHODS AND SYSTEMS FOR IMPROVING HYDROGEN REFUELING

(71) Applicant: Honda Motor Co., Ltd., Tokyo (JP)

(72) Inventor: Steven R. Mathison, Rancho Palos Verdes, CA (US)

(73) Assignee: Honda Motor Co., Ltd., Tokyo (JP)

(*) Notice: Subject to any disclaimer, the term of this patent is extended or adjusted under 35 U.S.C. 154(b) by 277 days.

(21) Appl. No.: 16/530,346

(22) Filed: Aug. 2, 2019

(65) Prior Publication Data

US 2020/0182410 A1    Jun. 11, 2020

Related U.S. Application Data

(60) Provisional application No. 62/775,627, filed on Dec. 5, 2018.

(51) Int. Cl.
    *F17C 13/02*      (2006.01)
    *F17C 5/04*      (2006.01)
    *F17C 5/06*      (2006.01)
    *H01M 8/04*      (2016.01)

(52) U.S. Cl.
    CPC ............... *F17C 13/02* (2013.01); *F17C 5/04* (2013.01); *F17C 5/06* (2013.01); *H01M 8/04* (2013.01)

(58) Field of Classification Search
    CPC .... F17C 13/02; F17C 5/04; F17C 5/06; F17C 2250/0694; F17C 2260/023; H01M 8/04
    See application file for complete search history.

(56) References Cited

U.S. PATENT DOCUMENTS

| | | | |
|---|---|---|---|
| 3,536,109 A | 10/1970 | Ginsburgh et al. | |
| 4,347,472 A | 8/1982 | Lemelson | |
| 4,398,172 A | 8/1983 | Carroll et al. | |
| 4,490,798 A | 12/1984 | Franks et al. | |
| 4,527,600 A | 7/1985 | Fisher et al. | |
| 4,934,419 A | 6/1990 | Lamont et al. | |
| 5,058,044 A | 10/1991 | Stewart et al. | |
| 5,201,819 A | 4/1993 | Ryan | |
| 5,202,617 A | 4/1993 | Nor | |
| 5,238,030 A | 8/1993 | Miller et al. | |
| 5,259,424 A | 11/1993 | Miller et al. | |
| 5,327,066 A | 7/1994 | Smith | |
| 5,359,522 A | 10/1994 | Ryan | |
| 5,479,966 A | 1/1996 | Tison et al. | |

(Continued)

FOREIGN PATENT DOCUMENTS

| CN | 101087975 A | 12/2007 |
|---|---|---|
| CN | 101488576 A | 7/2009 |

(Continued)

*Primary Examiner* — Jason K Niesz
(74) *Attorney, Agent, or Firm* — Stinson LLP (57) ABSTRACT

A hydrogen filling station accounts for variabilities between tank systems when filling compressed gas tanks. To identify a theta value that accurately reflects the conditions and performance of a particular tank system, one or more test parameters are determined, and one or more margins associated with one or more test fills of a fuel tank are identified, where each test fill corresponds to a respective test parameter. A proposed theta value for controlling one or more fuel deliveries to the fuel tank is determined based on the test parameters and the margins. In this manner, the theta value enables hydrogen refueling of a compressed gas tank to be improved.

10 Claims, 10 Drawing Sheets

(56) References Cited

U.S. PATENT DOCUMENTS

| | | |
|---|---|---|
| 5,564,306 A | 10/1996 | Miller |
| 5,569,922 A | 10/1996 | Clarke |
| 5,570,729 A | 11/1996 | Mutter |
| 5,594,318 A | 1/1997 | Nor et al. |
| 5,602,745 A | 2/1997 | Atchley et al. |
| 5,628,349 A | 5/1997 | Diggins et al. |
| 5,750,995 A | 5/1998 | Clarke |
| 5,762,118 A | 6/1998 | Epworth et al. |
| 5,868,176 A | 2/1999 | Barakas et al. |
| 5,868,479 A | 2/1999 | Hoffman |
| 5,881,779 A | 3/1999 | Kountz et al. |
| 5,956,259 A | 9/1999 | Hartsell, Jr. et al. |
| 5,970,786 A | 10/1999 | Smith et al. |
| 5,971,042 A | 10/1999 | Hartsell, Jr. |
| 6,024,137 A | 2/2000 | Strnad et al. |
| 6,068,030 A | 5/2000 | Tatsuno |
| 6,070,156 A | 5/2000 | Hartsell, Jr. |
| 6,073,081 A | 6/2000 | Hettinger et al. |
| 6,089,284 A | 7/2000 | Kaehler et al. |
| 6,185,501 B1 | 2/2001 | Smith et al. |
| 6,237,647 B1 | 5/2001 | Pong et al. |
| 6,250,347 B1 | 6/2001 | Tatsuno |
| 6,338,008 B1 | 1/2002 | Kohut et al. |
| 6,343,241 B1 | 1/2002 | Kohut et al. |
| 6,381,514 B1 | 4/2002 | Hartsell, Jr. |
| 6,382,269 B1 | 5/2002 | Tatsuno |
| 6,394,150 B1 | 5/2002 | Haimovich et al. |
| 6,401,767 B1 | 6/2002 | Cohen et al. |
| 6,463,967 B1 | 10/2002 | Boyle |
| 6,497,363 B1 | 12/2002 | Kelrich |
| 6,598,792 B1 | 7/2003 | Michot et al. |
| 6,619,336 B2 | 9/2003 | Cohen et al. |
| 6,672,340 B2 | 1/2004 | Mutter |
| 6,688,342 B2 | 2/2004 | Lewis |
| 6,708,573 B1 | 3/2004 | Cohen et al. |
| 6,727,809 B1 | 4/2004 | Smith |
| 6,745,801 B1 | 6/2004 | Cohen et al. |
| 6,822,551 B2 | 11/2004 | Li et al. |
| 6,964,821 B2 | 11/2005 | Hirakata |
| 7,059,364 B2 | 6/2006 | Kountz et al. |
| 7,171,989 B2 | 2/2007 | Corless et al. |
| 7,406,987 B2 | 8/2008 | Takano et al. |
| 7,412,994 B2 | 8/2008 | Corless et al. |
| 7,523,770 B2 | 4/2009 | Horowitz et al. |
| 7,543,611 B2 | 6/2009 | Kallberg |
| 7,647,194 B1 | 1/2010 | Casey et al. |
| 7,671,482 B2 | 3/2010 | Tighe |
| 7,820,313 B2 | 10/2010 | Winkler |
| 7,921,883 B2 | 4/2011 | Cohen et al. |
| 8,360,112 B2 | 1/2013 | Allidieres et al. |
| 8,517,062 B2 | 8/2013 | Allidieres et al. |
| 8,783,303 B2 | 7/2014 | Harty et al. |
| 9,347,614 B2 * | 5/2016 | Mathison .................. F17C 5/06 |
| 2005/0178463 A1 | 8/2005 | Kountz et al. |
| 2007/0090693 A1 | 4/2007 | Stabler |
| 2008/0000542 A1 | 1/2008 | Cohen et al. |
| 2008/0185068 A1 | 8/2008 | Cohen et al. |
| 2008/0231836 A1 | 9/2008 | Curello et al. |
| 2008/0289720 A1 | 11/2008 | Takano et al. |
| 2009/0044877 A1 | 2/2009 | Faudou et al. |
| 2009/0107577 A1 | 4/2009 | Allidieres et al. |
| 2009/0205745 A1 | 8/2009 | Farese et al. |
| 2010/0121551 A1 | 5/2010 | Boss et al. |
| 2010/0185360 A1 | 7/2010 | Windbergs et al. |
| 2010/0241470 A1 | 9/2010 | Smith |
| 2010/0294393 A1 | 11/2010 | Allidieres et al. |
| 2010/0307636 A1 | 12/2010 | Uemura |
| 2011/0035049 A1 | 2/2011 | Barrett |
| 2011/0100507 A1 | 5/2011 | Weitzhandler et al. |
| 2011/0259469 A1 | 10/2011 | Harty et al. |
| 2012/0192989 A1 | 8/2012 | Schulze |
| 2012/0267002 A1 | 10/2012 | Kittilsen et al. |
| 2015/0184804 A1 * | 7/2015 | Handa ................... F17C 13/026 141/1 |
| 2015/0308621 A1 * | 10/2015 | Mathison ................ F17C 5/007 141/4 |

FOREIGN PATENT DOCUMENTS

| | | |
|---|---|---|
| DE | 19643801 A1 | 5/1998 |
| EP | 0653585 A1 | 5/1995 |
| EP | 1205704 A1 | 5/2002 |
| EP | 1831597 A2 | 9/2007 |
| EP | 2093475 A1 | 8/2009 |
| WO | 2005120196 A3 | 12/2005 |
| WO | 2007077376 A3 | 7/2007 |

\* cited by examiner

| Constant | Definition | Units |
|---|---|---|
| a, b, c, d, e, f, g, h, i, j | Constant in the MC Equation: $$MC = a + b\frac{T_{amb}}{MAT_{(i)}} + c(\Delta t(i)) + d\left(\frac{T_{amb}}{MAT_{(i)}}\right)^2 + e(\Delta t(i))^2 + f(\Delta t(i))\left(\frac{T_{amb}}{MAT_{(i)}}\right)$$ $$+ g\left(\frac{T_{amb}}{MAT_{(i)}}\right)^3 + h\,\Delta t(i)^3 + i\left(\frac{T_{amb}}{MAT_{(i)}}\right)\Delta t(i)^2 + j\left(\frac{T_{amb}}{MAT_{(i)}}\right)^2\Delta t(i)$$ | N/A |
| k, l, m, n, p, q, r, s, v, y, z | Constant in the Enthalpy Map Equation: $$h_{ave\_EM(i)} = \alpha(i) + k + \frac{l}{MAT_{(i)}} + \frac{m}{MAT_{(i)}^2} + \frac{n}{MAT_{(i)}^3} + \frac{p}{MAT_{(i)}^4} + \frac{q}{MAT_{(i)}^5}$$ $$+ \frac{r}{t_{fin(i)}} + \frac{s}{t_{fin(i)}^2} + \frac{v}{t_{fin(i)}^3} + \frac{y}{t_{fin(i)}^4} + \frac{z}{t_{fin(i)}^5}$$ | N/A |
| $P_{final}$ | Ending fill pressure for RR control. It represents the maximum dispenser filling pressure | MPa |
| $T_{final}$ | Target temperature for end of fill in MC control calculations | Kelvin |
| $t_{min(hot)}$ | This is the minimum fill time which the MC equation is based on. The $\Delta t$ term in the MC equation is the time elapsed beyond $t_{min}$. The total fill time is thus defined as the sum of $t_{min}$ and $\Delta t$. | sec |
| AC, BC, GC, KC, JC | $$MC_{cold(i)} = AC + BC \times \ln\sqrt{\frac{U_{adiabatic-cold(i)}}{U_{init(cold)}}} + GC\left(1 - e^{-KC \times \Delta t_{cold(i)}}\right)^{JC}$$ | N/A |
| $P_{max}$ | a predetermined maximum gas pressure permitted within tank. | MPa |
| $t_{min(cold)}$ | This is the minimum fill time which the cold tank MC equation is based on. | sec |
| $\rho_{SOC\text{-}comm\text{-}end}$ | Target density for communications (IRDA) end of fill comparison. (typically set to 99% SOC) | kg/m³ |
| $\rho_{SOC\text{-}MC\text{-}end}$ | Maximum density for MC end of fill comparison when communication is present between tank temperature sensor and dispenser. (typically set to 115% SOC). | kg/m³ |
| $\rho_{SOC\text{-}MC\text{-}end\text{-}non\text{-}comm}$ | Maximum density for MC end of fill comparison when communication is not present between tank temperature sensor and dispenser (typically set at 100% SOC). | kg/m³ |

FIG. 4

Variables which vary with initial fill conditions, but stay fixed throughout the filling process

| Variable | Definition | Units |
|---|---|---|
| $T_{amb}$ | Ambient temperature measured by the dispenser | Kelvin |
| $P_{initial}$ | Initial measured pressure of the gas in the tank before fill commences | MPa |
| $T_{init(hot)}$ | Initial assumed temperature of the gas in the tank before fill commences | Kelvin |
| $V_{hot}$ | Volume of hot tank used to calculate initial mass $m_{init(hot)}$ | $m^3$ |
| $m_{cv(hot)}$ | Final mass in the hot tank @ 100% SOC | kg |
| $m_{init(hot)}$ | Initial calculated mass in the hot tank before fill commences | kg |
| $m_{add(hot)}$ | Calculated mass to be added to hot tank during the fill to achieve 100% SOC. | kg |
| $\rho_{init(hot)}$ | Initial calculated density of the gas in the hot tank before fill commences | $kg/m^3$ |
| $u_{init(hot)}$ | Initial specific internal energy of the gas in the tank before fill commences | kJ/kg |
| $U_{init(hot)}$ | Initial internal energy of the gas in the tank before fill commences | kJ |
| $MAT_{expected}$ | The expected mass average pre-cooling temperature of the gas at end of fill. This value is used only in the beginning of the fill and should be set as accurately as possible based on current conditions. | Kelvin |
| $TS$ | Tank size indicator used to indicate which tank to use for RR control ( 4 means 4kg tank, 7 means 7kg tank) | N/A |
| $M_{Temp}$ | a temporary variable used for calculation of $T_{int(cold)}$ | K |
| $C_{Temp}$ | a temporary variable used for calculation of $T_{int(cold)}$ | K |
| $T_{int(cold)}$ | Initial assumed temperature of the gas in the cold tank before the fill commences | K |
| $V_{cold}$ | Volume of cold tank used to calculate initial mass $m_{init(cold)}$ | $m^3$ |
| $m_{cv(cold)}$ | Final mass in the cold tank at 100% SOC | kg |
| $\rho_{init(cold)}$ | Initial calculated density of the gas in the cold tank before fill commences | $kg/m^3$ |
| $m_{init(cold)}$ | Initial calculated mass in the cold tank before fill commences. | kg |
| $m_{add(cold)}$ | Calculated mass to be added to cold tank during the fill to achieve 100% SOC | kg |
| $u_{init(cold)}$ | Initial specific internal energy of the gas in the cold tank before fill commences | kJ/kg |
| $U_{init(cold)}$ | Initial internal energy of the gas in the cold tank before fill commences | kJ |
| $P_{min}$ | minimum gas pressure in tank | MPa |
| $\Delta t_{cold(j)}$ | The time term in the cold MC equation. It is defined as the current fill time beyond $t_{min}$ | sec |
| $h_{(j)}$ | Enthalpy of the gas calculated as a function of $P_{(j)}$ and $T_{(j)}$ | kJ/kg |
| $h_{ave(j)}$ | Mass average enthalpy of the gas calculated as a function of $h_{(j)}$ and $\Delta m_{(j)}$ | kJ/kg |
| $U_{adiabatic-cold(j)}$ | The adiabatic internal energy of the gas in the cold tank. This is the internal energy which would exist under adiabatic conditions(i.e. no heat transfer from the gas to tank walls) | kJ/kg |
| $u_{adiabatic-cold(j)}$ | The specific adiabatic internal energy of the gas in the cold tank. This is the internal energy which would exist under adiabatic conditions(i.e. no heat transfer from gas to tank walls) | kJ/kg |
| $T_{adiabatic-cold(j)}$ | The adiabatic Temperature of the gas in the cold tank. This is the temperature which would exist under adiabatic conditions ( i.e. no heat transfer from the gas to the tank walls) | Kelvin |
| $Cv_{cold(j)}$ | Specific Heat Capacity of hydrogen at constant volume calculated for cold tank as a function of $P_{(j)}$ and $T_{adiabatic-cold(j)}$ | kJ/kgK |

FIG. 5

Variables which can vary every time step calculation cycle (denoted with (i), where i represents the cycle number, or with (j), where j represents the iteration number)

| Variable | Definition | Units |
|---|---|---|
| $t_{(i)}$ | Time of the current calculations step, defined as the time since the fill commenced (seconds) | sec |
| $t_{final(i)}$ | The total time required to fill from 2MPa to $P_{final}$ | sec |
| $t_{fin(j)}$ | An estimation of $t_{final(i)}$ used in the iteration calculations. Once the iterations have converged, $t_{final(i)}$ is set to $t_{fin(j)}$ | sec |
| $\Delta t_{hot(j)}$ | The time term in the MC equation. It is defined as the final fill time beyond $t_{min}$ | sec |
| $\Delta m_{(i)}$ | Change in mass or mass added from previous time step measurement | g |
| $T_{(i)}$ | Temperature of the gas measured at the dispenser | Kelvin |
| $P_{(i)}$ | Pressure of the gas measured at the dispenser | MPa |
| $T_{0ave(i)}$ | Mass average temperature of the gas measured from the beginning of the fill (t=0) | Kelvin |
| $T_{30ave(i)}$ | Mass average temperature of the gas measured beginning after 30 seconds (t=30) | Kelvin |
| $MAT_{(i)}$ | The mass average pre-cooling temperature which is used in the MC Equation and Enthalpy Map Equation | Kelvin |
| $\alpha_{(i)}$ | Adjustment factor to the Enthalpy Map Equation to account for variability in the pressure ramp rate during the fill | N/A |
| $\beta_{(i)}$ | A temporary variable used in calculating $\alpha_{(i)}$ | N/A |
| $h_{ave\_EM(j)}$ | Estimated mass average enthalpy at the end of the fill based on the Enthalpy Map Equation | kJ/kg |
| $u_{adiabatic-hot(j)}$ | The specific adiabatic internal energy of the gas in the hot tank. This is the internal energy which would exist under adiabatic conditions (i.e. no heat transfer from the gas to the tank walls) | kJ/kg |
| $T_{adiabatic-hot(j)}$ | The adiabatic temperature of the gas in the hot tank. This is the temperature which would exist under adiabatic conditions (i.e. no heat transfer from the gas to the tank walls) | Kelvin |
| $C_{v(i)}$ | Specific Heat Capacity of Hydrogen at constant volume | kJ/kgK |
| $MC_{hot(j)}$ | MC calculated for the hot tank by the hot tank MC equation | kJ/K |
| $MC_{req(j)}$ | MC required to achieve the target final gas temperature $T_{final}$ based on initial conditions and the enthalpy put into the tank. | kJ/K |
| $MC_{diff(j)}$ | The difference between the required MC ($MC_{req(j)}$) and the actual MC ($MC_{hot(j)}$). The target is for $MC_{diff(j)}$ to be zero. | kJ/K |
| $RR_{(i)}$ | Calculated Pressure Ramp Rate setting for time step i | MPa/sec |
| $RR_{min}$ | Minimum Calculated Pressure Ramp Rate for all time steps t=0 to t=$t_{(i)}$ | MPa/sec |
| $MC_{cold(i)}$ | MC calculated for the cold tank using the MC equation $$MC_{cold(i)} = AC + BC \times \ln\sqrt{\frac{U_{adiabatic-cold(i)}}{U_{init(cold)}}} + GC() \cdot e^{-KC \times \Delta t_{cold(i)}^{JC}}$$ | kJ/K |
| $T_{cold(i)}$ | Temperature of the gas calculated for the cold tank | K |
| $\rho_{SOC-MC(i)}$ | Calculated density of the gas in the cold tank using $P_{(i)}$ and $T_{cold(i)}$ | Kg/m³ |
| $T_{comm(i)}$ | Temperature of the gas measured in the tank | K |
| $\rho_{SOC-comm(i)}$ | Calculated density of the gas in the cold tank using $P_{(i)}$ and $T_{cold(i)}$ | Kg/m³ |

METHODS AND SYSTEMS FOR IMPROVING HYDROGEN REFUELING

CROSS-REFERENCE TO RELATED DISCLOSURE

This application claims the benefit of U.S. Provisional Patent Application No. 62/775,627, filed Dec. 5, 2018, which is incorporated by reference herein in its entirety.

BACKGROUND

Conventional hydrogen tank refueling procedures tend to be conservative, often conceding performance and/or efficiency. For example, current fueling protocols incorporate several conservative assumptions to account for a broad range of possible tank configurations and refueling conditions. This concession may be noticeable with non-communication fueling operations in which the parametric assumptions are even more conservative because the hydrogen station does not have information about the tank that it is filling. While current fueling protocols are structured to reduce the likelihood of overheating and/or overfilling, the wide margins inherent in these protocols can result in longer fill times and/or excessive energy usage.

SUMMARY

Examples of the disclosure enable hydrogen filling stations to account for variabilities between tank systems when filling compressed gas tanks. In one aspect, a method is provided for improving hydrogen refueling of a compressed gas tank. The method includes determining one or more test parameters, identifying one or more margins associated with one or more test fills of a fuel tank, and determining a proposed theta value based on the test parameters and the margins. Each test fill corresponds to a respective test parameter, and the proposed theta value is determined for controlling one or more fuel deliveries to the fuel tank.

In another aspect, a method is provided for filling a compressed gas tank. The method includes identifying a fuel tank, identifying a theta value associated with the fuel tank, and using the theta value to determine one or more fill times for use in controlling a delivery of hydrogen gas to the fuel tank. The theta value accounts for one or more variabilities between tank systems.

In yet another aspect, a control system is provided for improving hydrogen refueling of a compressed gas tank. The control system includes an input receiver configured to receive a plurality of measured values associated with a delivery of hydrogen gas to a fuel tank, and a controller configured to determine one of more test parameters, determine one or more margins associated with one or more test fills of the fuel tank, and determine a proposed theta value based on the test parameters and the margins. Each test fill corresponds to a respective test parameter of the test parameters, and the proposed theta value is determined for use in determining an adjusted fill time to produce a target state of charge within the fuel tank.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Examples described below will be more clearly understood when the detailed description is considered in conjunction with the accompanying drawings, in which:

FIGS. 4-6 are tables that define constants and variables used in an example MC Method;

It should be noted that these Figures are intended to illustrate the general characteristics of methods, structure and/or materials utilized in the examples and to supplement the written description provided below. These drawings are not, however, to scale and may not precisely reflect the precise structural or performance characteristics of any given example, and should not be interpreted as defining or limiting the range of values or properties encompassed by the examples.

Corresponding reference characters indicate corresponding parts throughout the drawings. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to fueling systems and, more particularly, to improving known hydrogen refueling methods and systems. As described in commonly-owned U.S. Pat. No. 9,347,614 entitled "Method and System for Tank Refilling Using Active Fueling Speed Control," which issued on May 24, 2016 from U.S. application Ser. No. 14/300,229 filed Jun. 9, 2014 and is incorporated by reference herein in its entirety, a hydrogen filling station may utilize an analytical method to calculate an end-of-fill temperature in a hydrogen tank that, in turn, allows for improvements in a fill quantity while tending to reduce refueling time. However, the amount of heat transferred from the fueling hardware to the hydrogen gas throughout the fill may have a significant effect on the gas temperature development inside a fuel tank of a vehicle. The present disclosure describes providing more-accurate predictions regarding the temperature of the hydrogen gas in the fuel tank during refueling, thereby enabling fill times to be reduced and/or warmer pre-cooling temperatures to be used. Other benefits and advantages will become clear from the disclosure provided herein and those advantages provided are for illustration.

Figure 1:
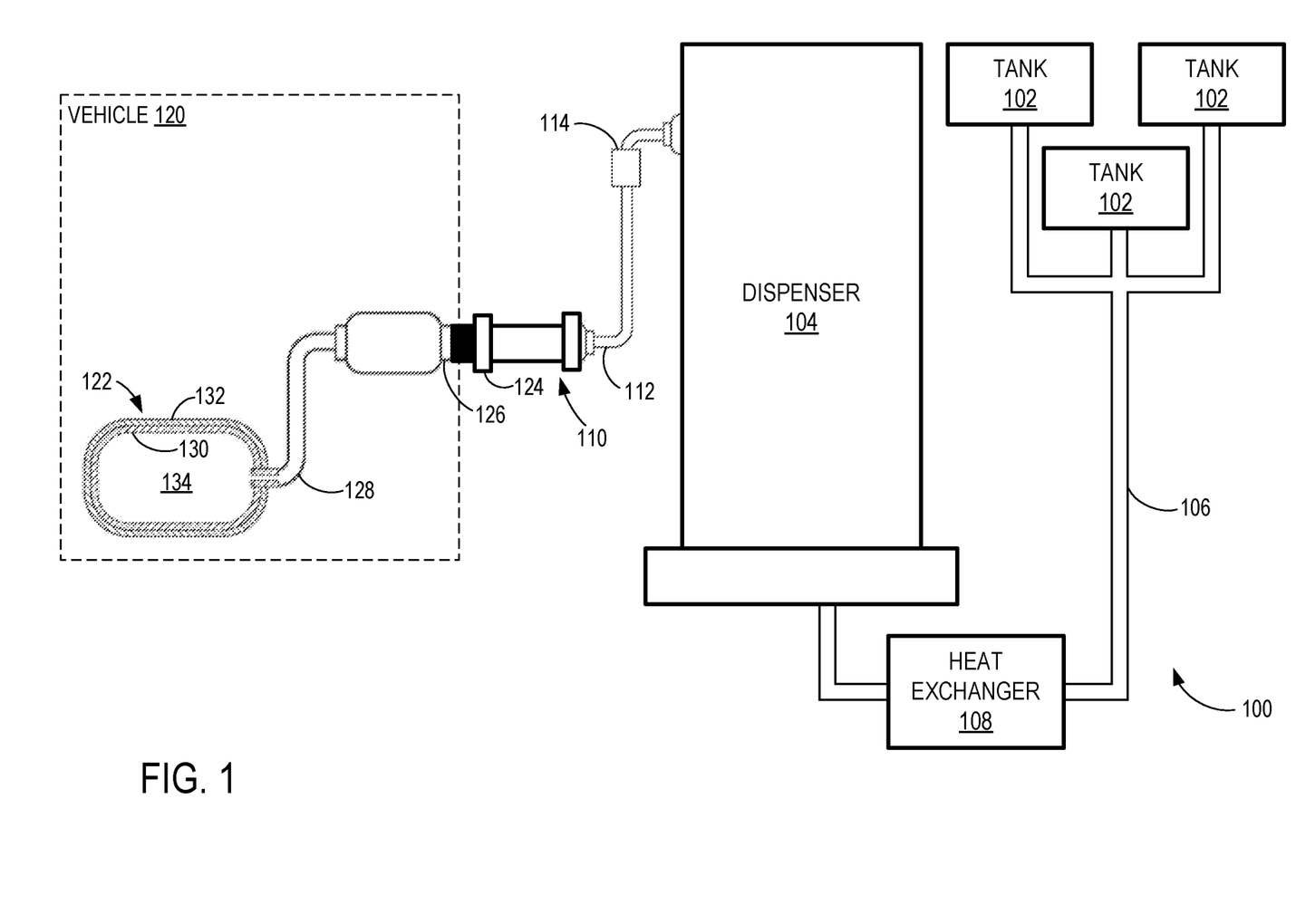
FIG. 1 is a schematic diagram of an example hydrogen station and an example vehicle at the hydrogen station in accordance with one aspect of the present disclosure.

FIG. 1 shows an example hydrogen station 100 in accordance with one aspect of the present disclosure. The hydrogen station 100 includes a fuel source including a plurality of tanks 102 for storing hydrogen (e.g., high-pressure hydrogen gas). The tanks 102 may be filled, for example, using hydrogen transported via trucks and/or pipes. Additionally or alternatively, hydrogen may be generated on site (e.g., by separating hydrogen from water or natural gas). While three tanks 102 are shown, the fuel source may include any number of tanks 102.

The tanks 102 may be coupled in fluid communication with a dispenser 104 via one or more pipes 106. In some examples, a heat exchanger 108 may be coupled to the pipes 106 for controlling a temperature of the hydrogen gas before or as it is channeled to the dispenser 104 (e.g., "pre-cooling" the hydrogen gas). For example, the heat exchanger 108 may cool the hydrogen gas to −40 degrees Celsius (° C.). The dispenser 104 may be coupled in fluid communication with a nozzle 110 via a hydrogen supply tube or hose 112. The hose 112 may include a breakaway 114 that allows the hose 112 to separate into multiple segments. In some examples, the dispenser 104 may include a nozzle holder (not shown) for holding the nozzle 110 detachably thereon. The nozzle holder may hold the nozzle 110, for example, when the fueling process is not being performed. In some examples, the hydrogen station 100 includes a compressor in direct communication with the dispenser 104 and/or heat exchanger 108.

When the fueling process is being performed, the nozzle 110 may be coupled to a vehicle 120 for filling a fuel tank 122 at the vehicle 120. The nozzle 110 may include, for example, a filling coupler 124 that is detachably coupleable to a hydrogen charging port 126 at the vehicle 120. In some examples, the dispenser 104 automatically starts charging hydrogen when the filling coupler 124 is coupled to the hydrogen charging port 126. During fueling, hydrogen gas may be channeled from the tanks 102 and through the pipes 106 and hose 112. At the vehicle 120, the hydrogen gas may be channeled from the hydrogen charging port 126 to the fuel tank 122 via tubing 128 extending between the hydrogen charging port 126 and the fuel tank 122. The dispenser 104, nozzle 110, and/or vehicle 120 may be equipped with a flow regulating valve, an open-close valve, and the like. In some examples, the vehicle 120 includes one or more manifolds (e.g., in multi-tank systems).

As shown in FIG. 1, the fuel tank 122 may include a tank liner 130 and an outer wall 132 extending generally about the tank liner 130. A Type III tank, for example, may have a tank liner 130 made from a metal material (e.g., aluminum, steel) and an outer wall 132 made from a carbon fiber, aramid fiber, fiberglass, and/or composite material, and a Type IV tank may have a tank liner 130 made from a polymer material (e.g., thermoplastic) and an outer wall 132 made from a carbon fiber material. The tank liner 130 may have an inner surface that defines a control volume 134 of the fuel tank 122.

Figure 2:
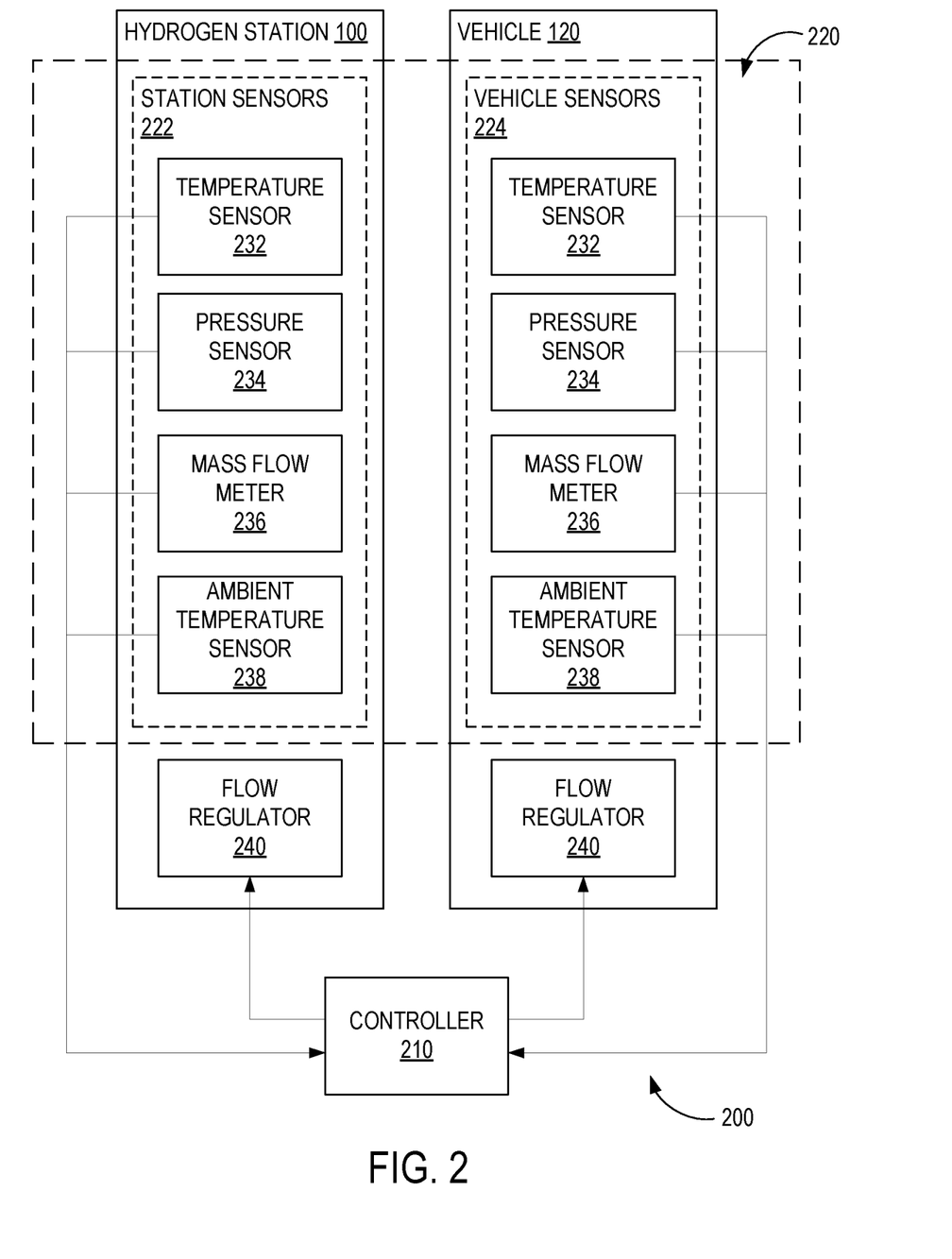
FIG. 2 is a schematic diagram of an example control system that may be used to control one or more operations at a filling station, such as the hydrogen station shown in FIG. 1, in accordance with one aspect of the present disclosure.

FIG. 2 shows an example control system 200 for managing one or more operations at the hydrogen station 100. The control system 200 may include a controller 210 that communicates with a plurality of sensors 220 to control a delivery of hydrogen gas.

In some examples, the sensors 220 may include one or more station sensors 222. Station sensors 222 may be disposed at one or more locations at the hydrogen station 100 to allow thermodynamic parameters to be identified before or as the hydrogen gas is leaving the dispenser 104 or nozzle 110. For example, one or more station sensors 222 may be at or adjacent the dispenser 104, breakaway 114, and/or nozzle 110 to detect or measure a temperature, pressure, and/or flow rate of hydrogen gas channeled through the pipes 106 and/or hose 112.

Additionally, the sensors 220 may include one or more vehicle sensors 224. Vehicle sensors 224 may be disposed at the vehicle 120 to allow thermodynamic parameters to be identified after the hydrogen gas has left the nozzle 110. For example, one or more vehicle sensors 224 may be at or adjacent the hydrogen charging port 126 and/or fuel tank 122 to detect or measure a temperature, pressure, and/or flow rate of hydrogen gas channeled through the tubing 128 and/or at the fuel tank 122. In some examples, the vehicle sensors 224 make direct measurements of the hydrogen gas at the vehicle 120 and transmit them, along with other vehicle information, to the controller 210 via one or more communication device(s) including, for example, an Infrared Data Association (IRDA) interface described in the SAE J2799 standard, the disclosure of which is incorporated herein by reference in its entirety.

The controller 210 may communicate with, and continuously receives measurement values as inputs from, the sensors 220 to identify various thermodynamic parameters in the manner described below. For example, station sensors 222 and/or vehicle sensors 224 may each include a temperature sensor 232, a pressure sensor 234, a mass flow meter 236, and/or an ambient temperature sensor 238. The controller 210 may include one or more arithmetic processors, computers, or any other devices capable of receiving all of the herein-described measurement values, performing all of the herein-described calculations, and controlling the dispenser 104 and/or nozzle 110 to dispense hydrogen at a calculated temperature, pressure, and/or flow rate. To this end, the control system 200 may include one or more hydrogen flow regulators (e.g., flow regulating valve, open-close valve), in addition to the heat exchanger 108 (shown in FIG. 1) and breakaway 114 (shown in FIG. 1). The sensors 220 may also include a connection sensor that detects whether the nozzle 110 is held on the nozzle holder and/or coupled to the hydrogen charging port 126.

Figure 3:
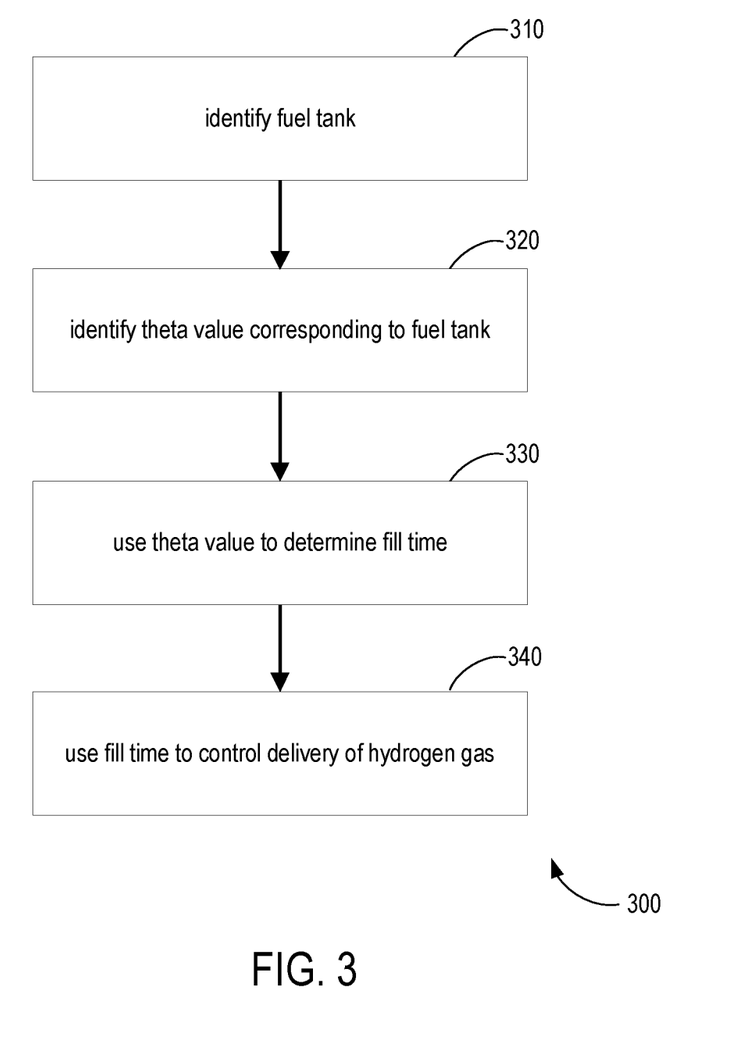
FIG. 3 is a flowchart of an example method for filling a fuel tank in accordance with one aspect of the present disclosure.

FIG. 3 shows an example method 300 for filling a compressed gas tank (e.g., fuel tank 122). One or more operations of the method 300 may be implemented using a controller 210 at a hydrogen station 100. The fuel tank 122 may be filled, for example, in accordance with the constants and variables shown in FIGS. 4-6.

A fuel tank 122 may be identified at operation 310. The amount of heat that transfers to or from the hydrogen gas during the refueling process varies across tank systems. Heat transfer may occur, for example, at the hydrogen station 100 between the hydrogen gas and a number of station components (e.g., pipes 106, heat exchanger 108, nozzle 110, hose 112, breakaway 114, filling coupler 124), and/or at the vehicle 120 between the hydrogen gas and a number of vehicle components (e.g., fuel tank 122, hydrogen charging port 126, tubing 128).

To tailor the fueling process to this particular hydrogen station-vehicle combination, a theta (θ) value corresponding to the vehicle 120 and/or fuel tank 122 may be identified at operation 320. This new parameter (i.e., θ) accounts for variability between tank systems and, thus, may be used to accommodate or compensate for each identifiable fuel tank 122. The theta value may be used, for example, to achieve faster fill times and/or to allow warmer pre-cooling temperatures, all while staying within parameter limits.

As shown in FIG. 3, the theta value may be used at operation 330 to determine a projected fill time ($t_{final}$) for use in delivering hydrogen gas to the fuel tank 122. The projected fill time may then be used at operation 340 to control a delivery of hydrogen gas to the fuel tank 122. The projected fill time may be used, for example, to determine a pressure ramp rate (PRR) for controlling a fueling speed of the hydrogen gas being delivered to the fuel tank 122. In some examples, the projected fill time may be used to allow a warmer pre-cooling temperature of the hydrogen gas. The projected fill time and/or pressure ramp rate may be determined to adjust the delivery of hydrogen gas. In some examples, the projected fill time and/or pressure ramp rate are iteratively determined throughout the fill. Additionally, a fill pressure (P) may be monitored throughout the fill to ensure that a target state of charge is achieved without overfilling.

Figure 7:
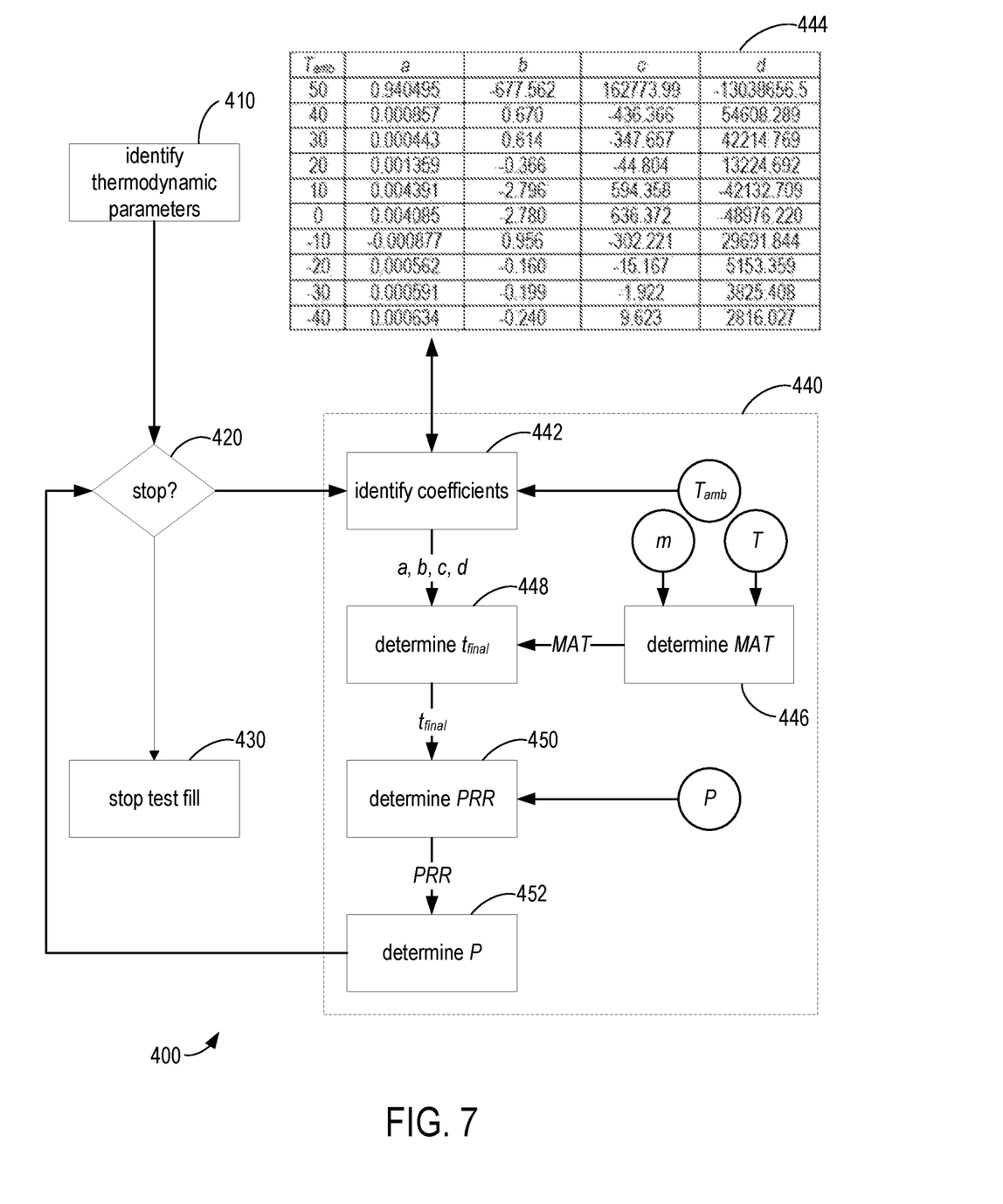
FIG. 7 is a flow diagram of an example method for conducting a fill test in accordance with one aspect of the present disclosure.

To account for variabilities between tank systems, a series of test fills may be conducted to generate test data for a particular tank system under various combinations of initial conditions and/or final outcomes regarding ambient temperature, dispenser condition (e.g., warm or cold), fuel temperature, fueling speed, fill pressure, tank temperature, tank pressure, tank capacity, vehicle-dispenser interface, state of charge, and fill time. FIG. 7 shows a method 400 for conducting a fill test. The test fills may be conducted, for example, using assumptions for one or more hot tank conditions used in the SAE J2601 standard. Such assumptions may include an initial pressure in the tank, a soak temperature of the tank, a temperature of the fuel in the tank, and an ambient temperature. The hydrogen fueling protocols described herein may be developed using computational modeling and/or experimental data, and the results may be analyzed to identify opportunities to improve fill times and/or energy consumption (e.g., used for pre-cooling).

As shown in FIG. 7, one or more thermodynamic parameters may be identified at operation 410 and monitored over time for each test fill. A fuel temperature (T), a fill pressure (P), a mass flow rate ($\dot{m}$), and/or an ambient temperature ($T_{amb}$), for example, may be identified continuously or iteratively (e.g., at a plurality of times) throughout the test fill. In some examples, values for T, P, $\dot{m}$, and $T_{amb}$ may be detected by and/or received from the temperature sensor 232, pressure sensor 234, mass flow meter 236, and ambient temperature sensor 238, respectively.

When a stop condition is satisfied at determination 420, the test fill may be stopped at operation 430. The test fill may be stopped, for example, when a target state of charge is achieved or a parameter limit is exceeded. Example stop conditions may include, without limitation, a fuel density (ρ) reaching a predetermined target fuel density (e.g., $\rho_{(i)} \geq \rho_{target}$), P reaching a predetermined maximum fill pressure (e.g., $P_{(i)} \geq P_{final}$), and/or T reaching a predetermined target temperature (e.g., $T_{(i)} \geq T_{target}$). To ensure compliance with the SAE J2601 standard, one or more parameters of the tank system may be determined and/or controlled to ensure that tank temperatures do not exceed a predetermined target temperature (e.g., the 85° C. limit established in the SAE J2601 standard).

In some examples, a fueling speed may be actively adjusted at operation 440 throughout the test fill. The fueling speed may be adjusted, for example, based on a pressure ramp rate (PRR). Using PRR to control the fueling speed may ensure that the fuel tank does not overheat during fueling. Under one heat capacity value-based method, PRR is calculated continuously or iteratively (e.g., at a plurality of times), and the fueling speed is accordingly adjusted, throughout the test fill.

To calculate a PRR, one or more coefficients (a, b, c, d) are identified at operation 442. As shown in FIG. 7, a table 444 may be used to identify values for a, b, c, and d based on $T_{amb}$. To account for variability in $T_{amb}$, values for a, b, c, and d may be identified continuously or iteratively (e.g., at a plurality of times) throughout the test fill. Values for a, b, c, and d may also be derived from fueling simulations using computational modeling and/or experimental data.

A mass average temperature of the hydrogen gas (MAT) is identified at operation 446. A value for MAT for a time interval i may be identified based on a change in mass (Δm) and T using Equation [1]:

$$MAT_{(i)} = \frac{\sum_1^i [\Delta m_{(i)} \times 0.5(T_{(i)} + T_{(i-1)})]}{\sum_1^i \Delta m_{(i)}} \quad [1]$$

where $\Delta m_{(i)}$ is a change in mass relative to the previous measurement (i.e., $m_{(i)} - m_{(i-1)}$);

$T_{(i)}$ is a fuel temperature according to the current measurement; and $T_{(i-1)}$ is a fuel temperature according to the previous measurement.

In some examples, a value for Δm is calculated by multiplying $\dot{m}$ by an amount of time elapsed between measurements.

For each time interval, a projected time to fill the fuel tank 122 ($t_{final}$) is identified at operation 448. A value for $t_{final}$ that accounts for variability in PRR may be calculated using Equation [2]:

$$t_{final} = \alpha \times \beta \times [a \times MAT^3 + b \times MAT^2 + c \times MAT + d] \quad [2]$$

where

α is an adjustment factor that accounts for variability in PRR; and

β is an adjustment factor to account for a pressure corridor which defines an upper pressure limit above the ramp pressure and a lower pressure limit below the ramp pressure during the fill.

A value for beta (β) may be calculated using Equation [3]:

$$\beta = \frac{(P_{final} - P_{min})}{(P_{final} - P_{min} - P_{tol})} \quad [3]$$

where $P_{final}$ is a predetermined maximum fill pressure (e.g., 125% of nominal working pressure);

$P_{min}$ is a predetermined minimum fill pressure (e.g., 0.5 MPa); and $P_{tol}$ is a predetermined fill pressure tolerance.

For each time interval, a value for PRR is calculated at operation 450 based on the projected fill time identified at operation 448 (e.g., $t_{final}$) using Equation [4]:

$$PRR_{(i)} = \frac{(P_{final} - P_{(i)})}{\left[t_{final} \times \frac{(P_{final} - P_{initial})}{(P_{final} - P_{min})} - t_{(i)}\right]} \quad [4]$$

where $P_{(i)}$ is a fill pressure according to the current measurement;
$P_{initial}$ is a fill pressure measured during fueling startup (e.g., at t=0); and
$t_{(i)}$ is an elapsed fill time according to the current measurement.

The projected fill time identified at operation 448 (e.g., $t_{final}$) may also be used to calculate a target fill pressure for a time interval i ($P_{target_{(i)}}$) at operation 452 using Equation [5]:

$$P_{target(i)} = P_i + \frac{(P_{final} - P_{(i)})}{\left[t_{final} \times \frac{(P_{final} - P_{initial})}{(P_{final} - P_{min})} - t_{(i)}\right]} \times [t_{(i+1)} - t_{(i)}] \quad [5]$$

where $t_{(i)}$ is a fill time according to the current measurement; and
$t_{(i+1)}$ is a fill time according to the next measurement.

The test fill is continued using PRR to control the fueling speed for the remainder of the current time interval until new values for T, P, ṁ, and $T_{amb}$ are calculated for the next time interval.

Figure 8:
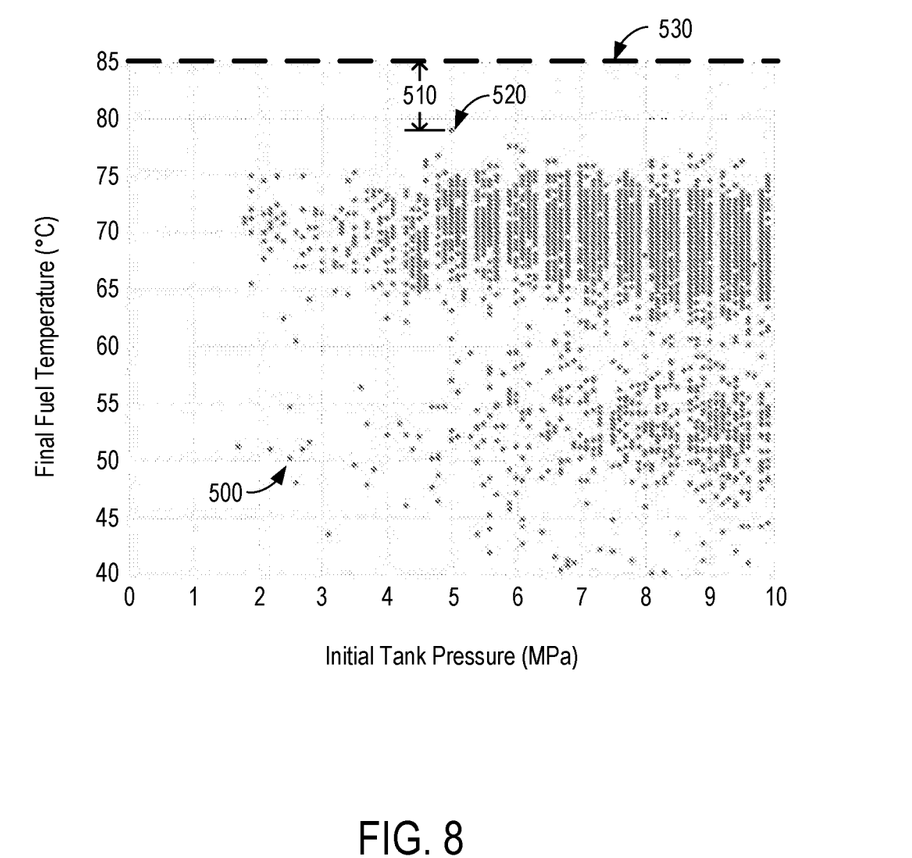
FIG. 8 is a scatter plot of a plurality of fill tests for a particular tank system using the method shown in FIGS. 7 and 8 in accordance with one aspect of the present disclosure.

FIG. 8 shows a plurality of dots 500 that show a relationship between initial tank pressures ($P_{initial}$) and final fuel temperatures ($T_{final}$) for a particular tank system. Each dot 500 represents one test fill from the test data set generated using method 400 described above. Similar graphs may be plotted for other tank systems and/or under other combinations of initial conditions and/or final outcomes.

As shown in FIG. 8, there is a margin 510 between the final fuel temperatures 520 and a target temperature 530 (e.g., $T_{target}$). The margin 510 for this particular tank system is the difference between one of the final fuel temperatures 520 (e.g., the highest final fuel temperature 520), which is approximately 79 OC, and a target temperature 530 of 85° C., which is a limit established in the SAE J2601 standard. The particular tank system that is the subject of the scatter plot shown in FIG. 8 may allow fuel temperatures to be higher and still stay within the parameter limit. That is, at least a portion of the margin 510 may be utilized to achieve faster fill times or achieve the same fill times with warmer pre-cooling temperatures (e.g., for improving station efficiency, lower costs, and/or customer satisfaction). To utilize at least a portion of the margin 510, a new parameter accounting for variability between tank systems, theta (θ), may be used to accommodate or compensate for a particular tank system.

Figure 9:
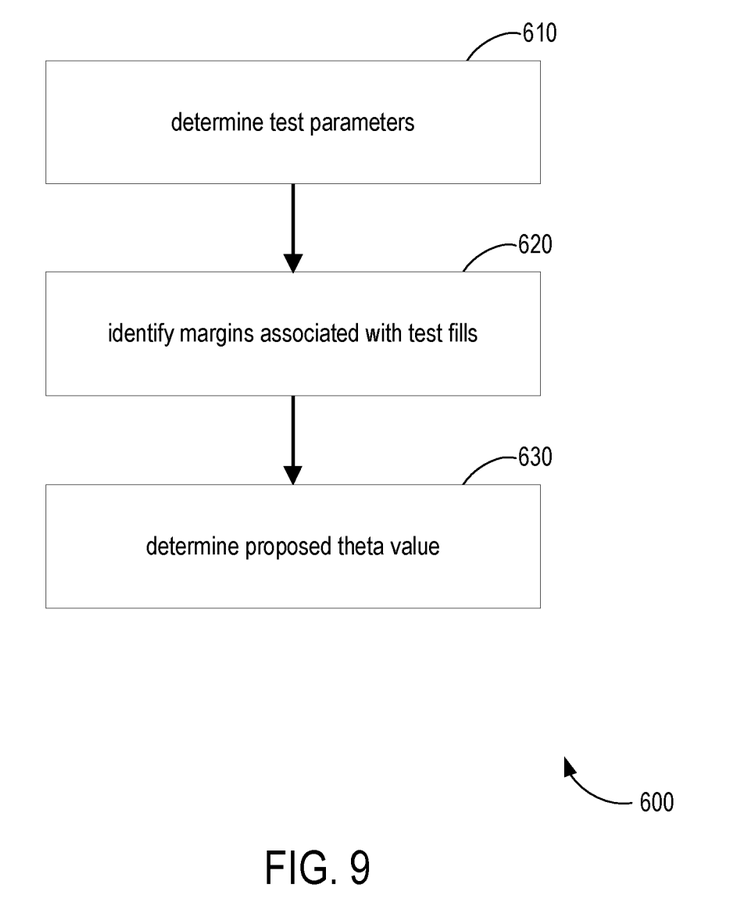
FIG. 9 is a flow diagram of an example method for improving hydrogen refueling in accordance with one aspect of the present disclosure.

FIG. 9 shows a method 600 for identifying a value for θ that accurately reflects the conditions and performance of a particular tank system. One or more test parameters may be determined at operation 610. Each test parameter may be used to control fuel delivery for a respective test fill. Equation [2], for example, may be modified as shown below in Equation [6]:

$$t_{final} = \theta \times \alpha \times \beta \times [a \times MAT^3 + b \times MAT^2 + c \times MAT + d]. \quad [6]$$

The scatter plot shown in FIG. 8 shows test results for a theta value of 1 (i.e., Equation [6] is equivalent to Equation [2] when θ=1).

One or more margins associated with the test fills (e.g., margin 510) may be identified at operation 620. As described above, the margins may be identified by identifying one or more thermodynamic parameters (e.g., final fuel temperatures 520), and comparing the thermodynamic parameters with one or more target parameters associated with the fuel tank 122 (e.g., target temperature 530). A final fuel temperature 520 and/or margin 510 may be recorded for each test parameter. For example, a first test using a first test parameter ($\theta_1$) may be conducted to generate a first test data set with a first final fuel temperature 520 ($T_{final_1}$) and a corresponding first margin 510. In some examples, the final fuel temperatures 520 and/or margins 510 are determined and/or confirmed using available data. Test parameters and their corresponding combinations of initial conditions, final fuel temperatures 520, and/or margins 510, for example, may be generated and/or determined using or based on one or more fueling simulations using computational modeling and/or experimental data.

If the first final fuel temperature 520 is equal to the target temperature 530 (i.e., if the first margin 510 is zero), then the value for $\theta_1$ accurately reflects the conditions and performance of the particular tank system, and is associated with the particular tank system. On the other hand, if the first fuel temperature 520 is not equal to the target temperature 530 (i.e., if the first margin 510 is not zero), then a second test using a second test parameter ($\theta_2$) may be conducted to generate a second test data set with a second final fuel temperature 520 ($T_{final_2}$) and a corresponding second margin 510. The second test may be conducted using the same parameters as those used in the first test, other than the test parameter. In some examples, a value for $\theta_2$ is determined based on the first test parameter, the first final fuel temperature 520, and/or the corresponding first margin 510. For example, a value for $\theta_2$ may be determined to produce a value for $T_{final_2}$ that is closer to the target temperature 530 than the first final fuel temperature 520 (e.g., so that the second margin 510 is less than the first margin 510).

If the second final fuel temperature 520 is equal to the target temperature 530 (i.e., if the second margin 510 is zero), then the value for $\theta_2$ accurately reflects the conditions and performance of the particular tank system, and is associated with the particular tank system. On the other hand, if the second final fuel temperature 520 is not equal to the target temperature 530 (i.e., if the second margin 510 is not zero), then a third test parameter or proposed theta value ($\theta_3$) is determined at operation 630 based on the test parameters and corresponding margins. For example, the value for the proposed parameter may be interpolated or extrapolated based on the first test parameter, the first final fuel temperature 520, the first margin 510, the second test parameter, the second final fuel temperature 520, and/or the second margin 510. That is, a value for $\theta_3$ may be determined to produce a third final fuel temperature 520 that is closer to the target temperature 530 than the first final fuel temperature 520 and/or second final fuel temperature 520 (e.g., so that the third margin 510 is less than the first margin 510 and/or second margin 510).

In some examples, a third test or check test fill is conducted using the proposed parameter to confirm that the corresponding final fuel temperature 520 ($T_{final_3}$) is equal to the target temperature 530, or at least has a margin 510 that is less than that of the first final fuel temperature 520 and that of the second final fuel temperature 520. The third test may be conducted using the same parameters as those used in the first test and/or second test, other than the test parameter. Additionally, a set of confirmatory tests may be conducted utilizing the proposed parameter while varying one or more other parameters, such as ambient temperature and/or pre-cooling temperature, to confirm that the final fuel temperature 520 does not exceed the target temperature 530 for various combinations of initial conditions. If the final fuel temperature 520 for the proposed parameter is confirmed not to exceed the target temperature 530 for various combinations of initial conditions, then the value for $\theta_3$ accurately reflects the conditions and performance of the particular tank system, and is associated with the particular tank system.

The value for $\theta$ that accurately reflects the conditions and performance of the particular tank system may be stored in a vehicle electronic control unit (ECU) such that it may be communicated with a controller 210. The controller 210 may be configured to receive one or more values for $\theta$ from one or more vehicles to account for variabilities between tank systems. In this manner, each fueling may be tailored to the particular tank system, ultimately reducing the amount of time required to fill the fuel tank 122 with a given pre-cooling temperature and/or achieving a comparable fill time using a warmer pre-cooling temperature.

Figure 10:
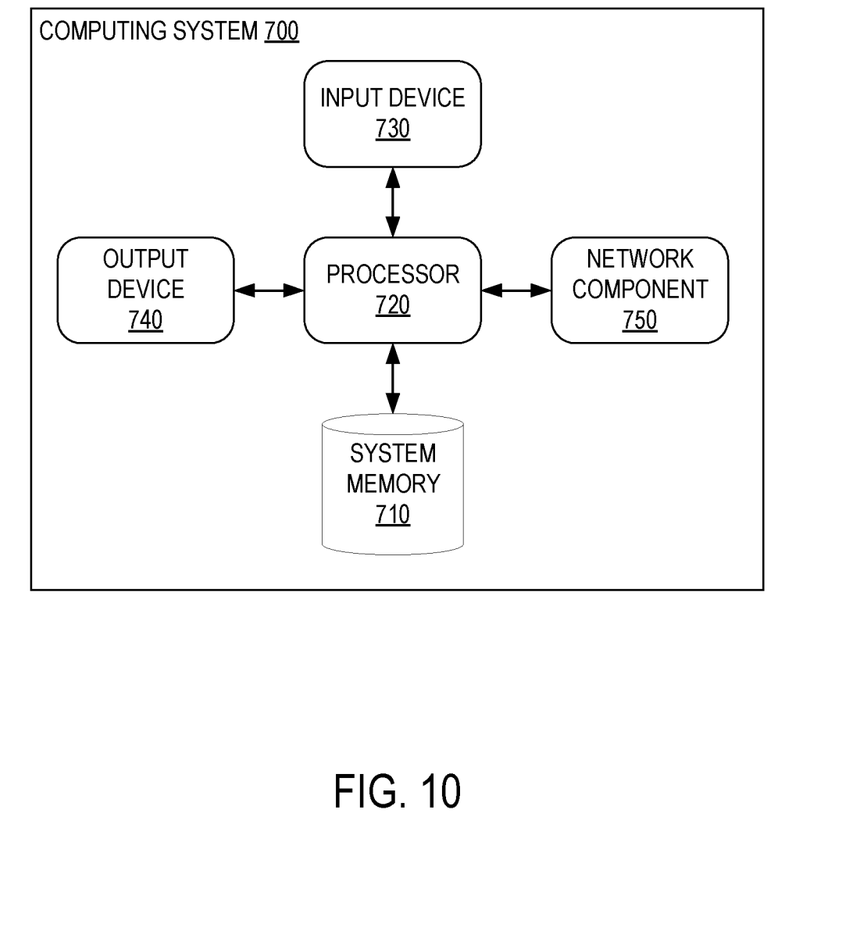
FIG. 10 is a block diagram of an example computing system that may be used to control a fueling procedure at a filling station, such as using the hydrogen station shown in FIG. 1, in accordance with one aspect of the present disclosure.

FIG. 10 shows an example computing system 700 configured to perform one or more computing operations. While some examples of the disclosure are illustrated and described herein with reference to the computing system 700 being included in a controller 210 (shown, e.g., in FIG. 1), aspects of the disclosure are operable with any computing system (e.g., dispenser 104, vehicle 120, sensor 220, station sensor 222, vehicle sensor 224, temperature sensor 232, pressure sensor 234, mass flow meter 236, ambient temperature sensor 238) that executes instructions to implement the operations and functionality associated with the computing system 700. The computing system 700 shows only one example of a computing environment for performing one or more computing operations and is not intended to suggest any limitation as to the scope of use or functionality of the disclosure.

In some examples, the computing system 700 includes a system memory 710 and a processor 720 coupled to the system memory 710. The system memory 710 stores data associated with the control system 200 and computer-executable instructions, and the processor 720 is programmed or configured to execute the computer-executable instructions for implementing aspects of the disclosure using the control system 200. The system memory 710 includes one or more computer-readable media that allow information, such as the computer-executable instructions and other data, to be stored and/or retrieved by the processor 720. For example, at least some data may be associated with one or more fuel tanks, vehicles, fuel types, fuel amounts, fuel temperatures, fuel pressures, flow rates, ambient temperatures, one or more control mechanisms (e.g., heat exchanger 108, breakaway 114, hydrogen flow regulator 240), and/or one or more sensors (e.g., sensors 220, station sensors 222, vehicle sensors 224, temperature sensors 232, pressure sensors 234, mass flow meters 236, ambient temperature sensors 238) such that the computer-executable instructions enable the processor 720 to manage or control one or more operations of the controller 210.

By way of example, and not limitation, computer-readable media may include computer storage media and communication media. Computer storage media are tangible and mutually exclusive to communication media. For example, the system memory 710 may include computer storage media in the form of volatile and/or nonvolatile memory, such as read only memory (ROM) or random access memory (RAM), electrically erasable programmable read-only memory (EEPROM), solid-state storage (SSS), flash memory, a hard disk, a floppy disk, a compact disc (CD), a digital versatile disc (DVD), magnetic tape, or any other medium that may be used to store desired information that may be accessed by the processor 720. Computer storage media are implemented in hardware and exclude carrier waves and propagated signals. That is, computer storage media for purposes of this disclosure are not signals per se.

In some examples, the processor 720 executes the computer-executable instructions to determine one or more test parameters, identify one or more margins associated with one or more test fills, and determine a proposed theta value for controlling one or more fuel deliveries to a particular fuel tank based on the test parameters and margins. Upon identifying a particular fuel tank, for example, a theta value associated with the fuel tank may be identified and used to determine one or more fill times for use in delivering hydrogen gas to the fuel tank. A state of the control system 200 may be monitored (e.g., using one or more sensors 220), and one or more control mechanisms (e.g., heat exchanger 108, breakaway 114, hydrogen flow regulator 240) may be adjusted based on the monitoring. For example, a flow rate of the hydrogen gas may be adjusted and/or heat may be removed from the hydrogen gas based on the state of the control system 200. The processor 720 may include one or more processing units (e.g., in a multi-core configuration). Although the processor 720 is shown separate from the system memory 710, examples of the disclosure contemplate that the system memory 710 may be onboard the processor 720, such as in some embedded systems.

A user or operator may enter commands and other input into the computing system 700 through one or more input devices 730 (e.g., sensors 220, station sensors 222, vehicle sensors 224, temperature sensors 232, pressure sensors 234, mass flow meters 236, ambient temperature sensors 238) coupled to the processor 720. The input devices 730 are configured to receive information (e.g., from the user). Example input devices 730 include, without limitation, a pointing device (e.g., mouse, trackball, touch pad, joystick), a keyboard, a game pad, a controller, a microphone, a camera, a gyroscope, an accelerometer, a position detector, and an electronic digitizer (e.g., on a touchscreen). Information, such as text, images, video, audio, and the like, may be presented to a user via one or more output devices 740 coupled to the processor 720. The output devices 740 are configured to convey information (e.g., to the user). Example, output devices 740 include, without limitation, a monitor, a projector, a printer, a speaker, a vibrating component. In some examples, an output device 740 is integrated with an input device 730 (e.g., a capacitive touchscreen panel, a controller including a vibrating component).

One or more network components 750 may be used to operate the computing system 700 in a networked environment using one or more logical connections. Logical connections include, for example, local area networks and wide area networks (e.g., the Internet). The network components 750 allow the processor 720, for example, to convey information to and/or receive information from one or more remote devices, such as another computing system or one or more remote computer storage media. Network components 750 may include a network adapter, such as a wired or wireless network adapter or a wireless data transceiver.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

Example filling stations and control systems for filling stations are described herein and illustrated in the accompanying drawings. This written description uses examples to disclose aspects of the disclosure and also to enable a person skilled in the art to practice the aspects, including making or using the above-described systems and executing or performing the above-described methods. The actual amount of heat transferred from the fueling hardware to the hydrogen gas throughout the fill is inherently less than the amount of heat transferred in conventional, more-conservative fueling protocols. Examples described herein provide shorter fill times and/or reduced energy usage by accounting for one or more variabilities between tank systems and tailoring fueling processes to specific tank systems.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, other filling stations.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of improving hydrogen refueling of a compressed gas tank, the method comprising:
   determining one or more test parameters;
   identifying one or more margins associated with one or more test fills of a fuel tank, each test fill of the one or more test fills corresponding to a respective test parameter of the one or more test parameters;
   determining a proposed theta value based on the one or more test parameters and the one or more margins, wherein the proposed theta value is one or more of interpolated or extrapolated from the one or more test parameters based on the one or more margins, the proposed theta value determined for controlling one or more fuel deliveries to the fuel tank; and
   conducting a check test fill using the proposed theta value.

2. The method of claim 1, further comprising conducting the one or more test fills using the one or more test parameters.

3. The method of claim 1, wherein identifying the one or more margins comprises:
   identifying one or more thermodynamic parameters associated with the one or more test fills; and
   comparing the one or more thermodynamic parameters with one or more target parameters associated with the fuel tank.

4. The method of claim 1, wherein:
   determining the one or more test parameters comprises determining a first test parameter and a second test parameter,
   identifying the one or more margins comprises identifying a first margin associated with a first test fill of the one or more test fills and a second margin associated with a second test fill of the one or more test fills, the first test fill corresponding to the first test parameter, the second test fill corresponding to the second test parameter, and
   the second test parameter is determined based on the first test parameter and the first margin such that the second margin is less than the first margin.

5. The method of claim 1, wherein determining the proposed theta value comprises determining the proposed theta parameter such that a check margin associated with a check test fill of the fuel tank is less than each margin of the one or more margins, the check test fill corresponding to the proposed theta value.

6. The method of claim 1, further comprising determining a fill time for the fuel tank.

7. The method of claim 1, further comprising:
   identifying a check margin associated with a check test fill conducted using the proposed theta value; and
   comparing the check margin with each margin of the one or more margins associated with the one or more test fills.

8. The method of claim 7, wherein identifying the check margin comprises:
   identifying one or more thermodynamic parameters associated with the check test fill; and
   comparing the one or more thermodynamic parameters with one or more target parameters associated with the fuel tank.

9. A method of improving hydrogen refueling of a compressed gas tank, the method comprising:
   determining one or more test parameters;
   identifying one or more margins associated with one or more test fills of a fuel tank, each test fill of the one or more test fills corresponding to a respective test parameter of the one or more test parameters;

determining a proposed theta value based on the one or more test parameters and the one or more margins, the proposed theta value determined for controlling one or more fuel deliveries to the fuel tank;

conducting a check test fill using the proposed theta value;

identifying a check margin associated with the check test fill; and comparing the check margin with each margin of the one or more margins associated with the one or more test fills.

10. A method of improving hydrogen refueling of a compressed gas tank, the method comprising:

determining one or more test parameters;

identifying one or more margins associated with one or more test fills of a fuel tank, each test fill of the one or more test fills corresponding to a respective test parameter of the one or more test parameters;

determining a proposed theta value based on the one or more test parameters and the one or more margins, the proposed theta value determined for controlling one or more fuel deliveries to the fuel tank;

conducting a check test fill using the proposed theta value, wherein a check margin associated with the check test fill is less than each margin of the one or more margins.

* * * * *